L. H. PALMER.
DUMPING PLATFORM.
APPLICATION FILED OCT. 25, 1920.

1,433,644.

Patented Oct. 31, 1922.
2 SHEETS—SHEET 1.

INVENTOR
L. H. Palmer
BY HIS ATTORNEYS
James F. Williamson

L. H. PALMER.
DUMPING PLATFORM.
APPLICATION FILED OCT. 25, 1920.
1,433,644.
Patented Oct. 31, 1922.
2 SHEETS—SHEET 2.
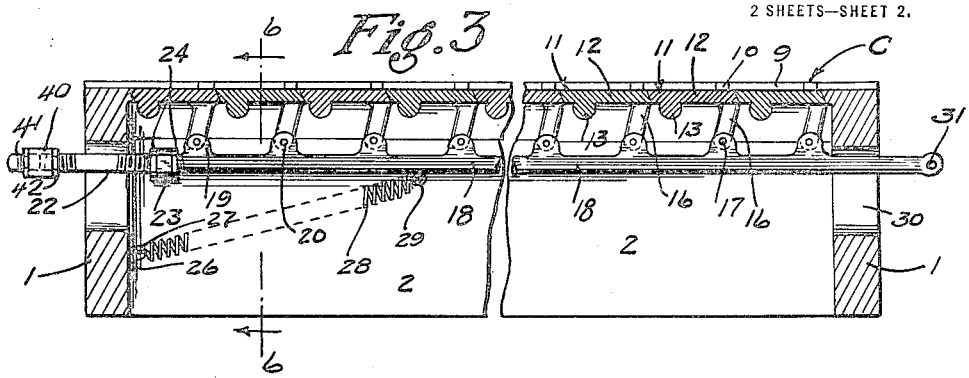
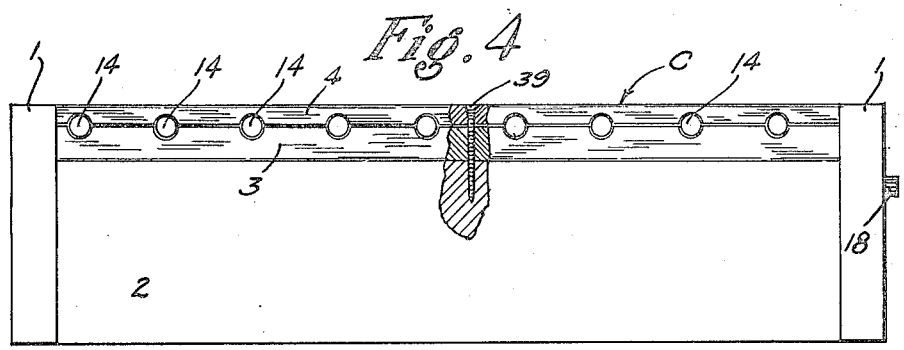
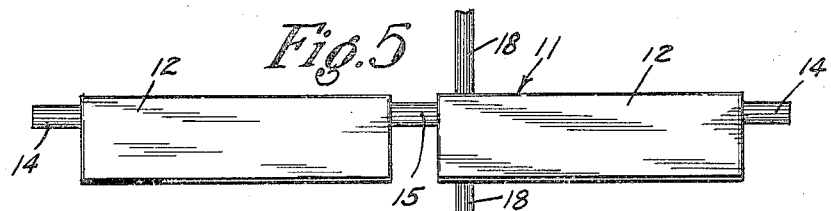
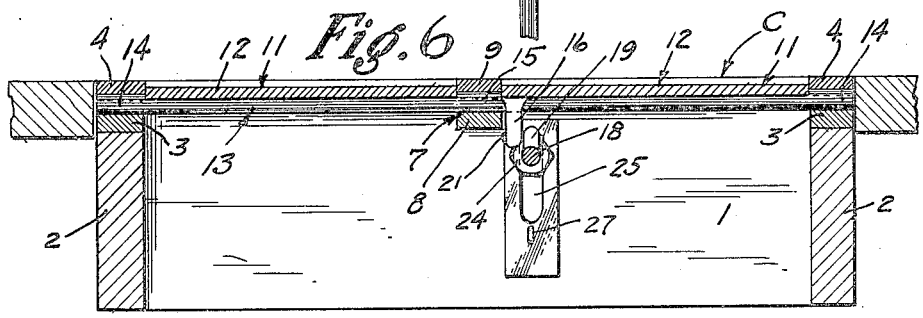
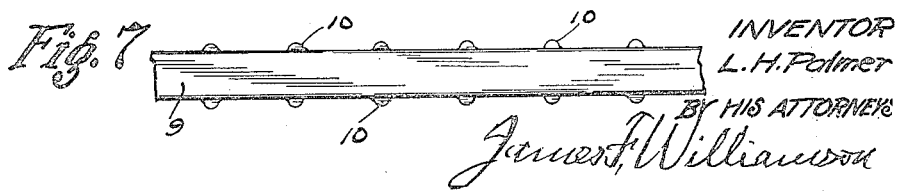
INVENTOR
L. H. Palmer
BY HIS ATTORNEYS
James F. Williamson Patented Oct. 31, 1922.

1,433,644

UNITED STATES PATENT OFFICE.

LOUIS H. PALMER, OF HURDSFIELD, NORTH DAKOTA.

DUMPING PLATFORM.

Application filed October 25, 1920. Serial No. 419,274.

*To all whom it may concern:*

Be it known that I, LOUIS H. PALMER, a citizen of the United States, residing at Hurdsfield, in the county of Wells and State of North Dakota, have invented certain new and useful Improvements in Dumping Platforms; and I do hereby declare the following to be a full, clear, and exact description of the invention, such as will enable others skilled in the art to which it appertains to make and use the same.

This invention relates to a dumping platform or trap to be used in the grain dump of grain elevators.

In such elevators, it is customary to have the grain brought thereto in wagons, the grain being either in bulk in the wagon bed or contained in sacks therein. A suitable discharge chute is arranged to communicate with an opening in the floor, in relation to which the wagon is conveniently arranged. This opening is usually covered by a heavy trap door which must be opened for each wagon-load of grain as the wagon is customarily drawn thereover. It is necessary that the door be opened a great number of times every day that grain is being taken in the elevator. This necessitates a large amount of very hard labor.

It is an object of this invention to provide a discharge platform or trap to replace the heavy trap doors referred to above, which platform or trap can be conveniently and easily operated.

It is another object of the invention to provide such a platform or trap of few simple compact parts designed to withstand the heavy usage to which they are subjected.

A further object of the invention is to provide such a platform which may be easily and readily installed in place of the trap door heretofore used.

Other objects of the invention will become apparent as the description proceeds, in connection with the accompanying drawings, in which like reference characters refer to the same parts throughout the different views, and in which—

Fig. 3 is a sectional view taken on the line 3—3 of Fig. 2, looking in the direction of the arrows;

Fig. 4 is a view of the device in end elevation;

Fig. 5 is a view of one of the parts of the device;

Fig. 6 is a sectional view of the device taken on the line 6—6 of Fig. 3; and

Fig. 7 is a top plan view of the central bearing member of applicant's device.

Figure 1:
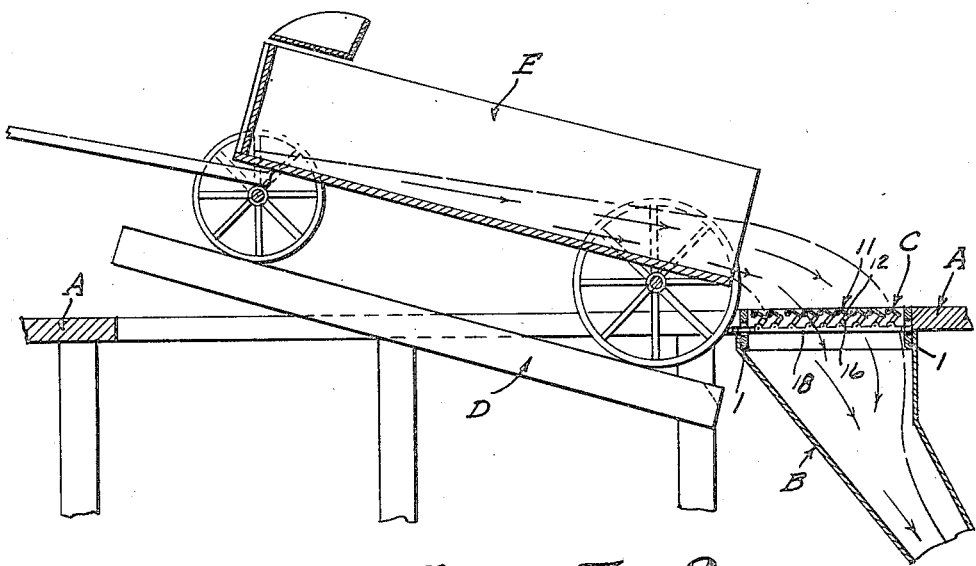
Fig. 1 shows a view of the device in section, together with part of the elevator floor and dumping log, a wagon being shown on the log and discharging grain into a chute through the device.
Figure 2:
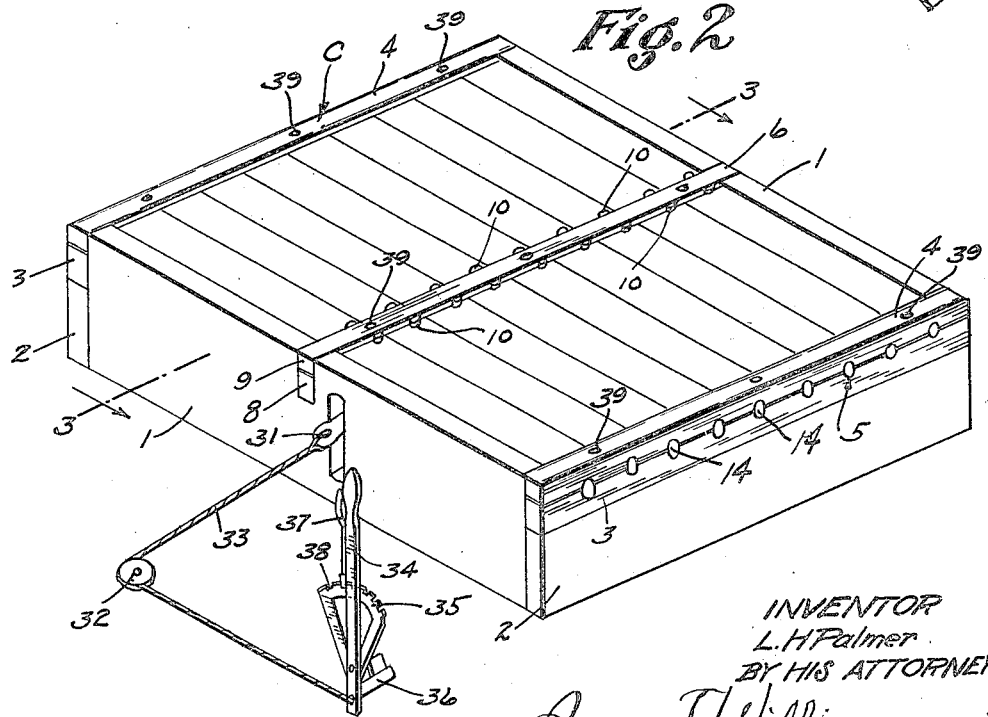
Fig. 2 is a perspective view of applicant's device.

Referring to the drawings, the operation of the device is shown in Fig. 1. A part of the elevator floor is shown as A communicating with which is a chute B disposed within the upper end of which and arranged flush with the floor is applicant's novel dumping platform designated generally as C. Adjacent thereto is a tiltable dumping log D. A wagon E is shown in position on the log D with its rear end in position to discharge grain onto the platform C. It will be understood that the dumping log D is normally arranged to have its upper surface flush with the floor A. The device C will have its upper surface in the position shown in Fig. 2 and the wagon will then be drawn over the device C and onto the dumping log D, and the latter can then be tilted to bring the wagon into the desired discharging position.

Specifically, the device comprises side members 1 to which are connected the end members 2, to form a heavy box-like structure. Disposed upon the members 2 are multiple bearing blocks 3 arranged to have the cap strips 4 of the same length secured thereto. The members 3 and 4 have therein a plurality of openings 5 forming bearings. Extending between these side members 1 with its upper side flush therewith and centrally disposed between the members 2, is a third bearing strip 6 carrying a plurality of bearings 7, the openings of which are arranged in alignment with the opening 5. The member 6 similarly to the end bearings is composed of a lower strip 8 and a cap strip 9. The cap strip 9 has extending from each side thereof a series of lugs 10 for a purpose later to be described. It will be understood that the bearing strips 3 and 4, and 8 and 9 will be firmly secured together by any suitable fastening means, preferably by cap screws 39, to form rigid bearing members. While any suitable material may be used for the above parts, the frame members 1 and 2 will, preferably, be made of suitable timber, while the bearing strips will be preferably made from suitable metal.

The top or floor of the platform is composed of a series of members designated generally as 11. The members 11 each comprise a pair of spaced plates 12. These plates are of general rectangular form in plan and have their side edges formed beveled and parallel, as shown in Fig. 3. Extending beneath the plates 12, near one edge thereof, is a connecting member 13, which is arranged to project beyond the outer edges of the plates 12 to form journal portions 14. The member 13 is also made of cylindrical form between the plates to also provide a journal member 15. The journal members 14 are arranged to be disposed in the bearing openings 5 and the journals 15 are disposed in the bearings 7. It will thus be seen that when the series of members 11 are in position, the beveled sides of the same will contact and the upper surfaces of the plates 12 will form a smooth continuous floor extending from one side to the other of the device. Depending from each of the members 11, and as shown, from the right hand plate 12, as shown in Fig. 5, and near its left hand edge, is an arm 16 which is provided with pivot opening 17. With the device in a position shown in Fig. 3, it will be seen that the pivot openings 17 are in substantially horizontal alignment. The arms 16 are all connected to a rod 18, which has lugs 19 formed thereon having openings 20 therein. Rivets 21, or other suitable pivotal means pass through the openings 17 and 21 and thus connect the arms 16 to the rod 18. This rod is formed with screw threads 22 thereon in one end, and a nut 23 is disposed on said threads. Locking nuts 24 are shown disposed in each side of the nut 23 to lock the same in any adjusted position. The threaded end of rod 18 is arranged to pass through a slot 25 formed in one of the members 1, which slot, however, is made sufficiently narrow to prevent the passage of nuts 23 and 24. A slotted plate or wearing member 26 arranged to surround the slot 25 is shown disposed inside of the member 1 and against which the nuts 24 will contact for a purpose hereinafter described. Secured to the lower side of the plate 26 by an eye-bolt 27, or other suitable means, is a strong spring 28, the other end of which is secured to a lug 29 depending from bar 18. The other end of bar 18 projects through a slot 30 formed in the member 1, and this end is provided with an aperture 31.

Suitably disposed at one side of the device and secured to the flooring or other fixed structure is a sheave 32. A flexible member or cable 33 is secured to rod 18 through the aperture 31 and is arranged to pass over the sheave 32 and be connected to a lever 34 at the lower end thereof. This lever 34 will be disposed in some convenient location and is journaled for swinging movement adjacent a pawl rack 35 by means of a journal 36. A suitable spring pawl 37 of well known construction is arranged to hold the lever in any one of various positions determined by the notches 38 of the pawl rack 35.

The operation of the device is as follows:

The members 12 are normally held in open position similar to that shown in Fig. 1, by the contraction of spring 28. This spring pulls the bar 18 to the left, as seen in Fig. 3, and when the cable 33 is relaxed, the end of bar 18 attached thereto drops downwardly to a certain extent. The members 12 swing on the pivots and assume an open position. The position of the members 12 and the extent of the openings therebetween is determined by engagement of the nut 24 with plate 26. As the nut 24 is adjustable with nut 23, the amount of opening between the plates can be regulated to the desired amount. With the trap or platform thus opened, grain can be discharged thereonto and therethrough, as illustrated in Fig. 1.

When it is desired to close the plates 12 to enable the wagon to be driven thereover, or to afford a support for other purposes, the cable 33 is pulled by means of lever 34. The rod 18 is then drawn to the right, as seen in Fig. 3, the spring 28 placed under tension, and the plates brought into the position shown in said figure. The lugs 10 on bearing strip 6 form stops for the upward movement of said plates. The plates are locked in closed position by engagement of pawl 37 with pawl rack 35. When the plates are thus closed, the upper surfaces thereof form a smooth and continuous platform, capable of supporting any desired load. The grain carrying wagon can be readily driven thereover and onto the dumping log. D. It will be understood that the device will be firmly secured to the adjacent portion of the floor and the top of chute B by bolts, screws, or any other desired wooden or metal construction.

The labor required to operate applicant's device by means of the lever 34 will be exceedingly small compared to that necessary to operate the heavy trap doors heretofore used. Furthermore, applicant's device has no parts which are in the way of the usual operations performed in the grain elevator.

The device is composed of few and simple parts and ones which can be made and assembled with a small expenditure of labor. The plates 11 can be made as steel castings, or may be formed in a forging machine. If it is desired to make the parts of sufficient dimensions, the plates 12 might be constructed of wood and have the arms 16 bolted thereto.

It will also be understood that any equivalent operating means, such as a windlass or drum having a pawl and ratchet mechanism, could be substituted for the lever operating means shown.

If desired, the rod 18 can be prolonged to extend outside of the slot 25, and equipped with an oppositely threaded nut 40. This nut 40 will engage the threaded end of the rod and also one end of a short threaded rod 41. By turning the nut 40, the distance that the rod projects beyond the frame 1 can be regulated. Lock nuts 42 are arranged at each side of the nut 40 to hold the same in adjusted position. The purpose of extending the rod, as described, is to enable the same to be operated by means of the dumping platform D shown in Fig. 1. As indicated in the dotted lines, this platform will be arranged with a cam slot therein so that when the same is swung to its horizontal or closed position the end of rod 41 will be engaged in said cam slot and moved thereby to the right, thus closing the plates 12 and the platform.

Various other changes in the form and details of the parts can be made without departing from the spirit of applicant's invention. Generally stated, the said invention consists in the structure illustrated and described and as set forth in the appended claims.

What is claimed is:

1. A dumping platform comprising a series of parallel pivoted plates having their adjacent edges contacting and adapted to have their upper surfaces lie substantially in one plane to present a smooth upper surface, an arm depending from each plate, a member having pivoted connection with all of said arms, automatic means for moving said member in one direction for maintaining said plates in open position and means for moving said member in the opposite direction to close said plates to present a smooth upper surface.

2. A dumping platform comprising a series of parallel plates pivoted on an axis adjacent one longitudinal edge thereof and having their edges abutting to form a smooth upper surface, an arm depending from each of said plates, a member pivoted to all of said arms, means for moving said member in one direction to hold the plates normally in open position, adjustable means on said member to determine said open position, and means for moving said member in the opposite direction to close said plates so as to form a smooth upper surface adapted to form a floor constructed to support a heavy load.

3. A dumping platform comprising a series of parallel pivoted plates having their edges abutting to present a smooth upper surface, an arm depending from each of said plates, a member pivotally connected to all of said arms, automatic means for moving said member in one direction to hold the plates normally in open position, means on said member by which said open position may be varied, means for moving said member in the opposite direction to close said plates and stop means against which the plates contact to limit their closing movement.

4. A dumping platform having in combination a plurality of parallel plates having abutting longitudinal edges beveled and arranged to present a smooth upper surface, each of said plates having lateral journals and a central journal, a capped bearing strip at each side of the device having bearings for the lateral journals, a central cap bearing strip having bearings for the central journals, an arm depending from each of said plates, a rod pivotally connected to the ends of all of said bars, a spring for moving said rod in one direction to swing the plates in their journals to form openings therebetween, adjustable means on said rod for determining the open position of said plates, means connected to said rod for moving it in the opposite direction to close said plates to present a smooth upper surface, and stop lugs carried by said central bearing strip with which said plates contact to limit the closing movement thereof.

5. A dumping platform having in combination a series of parallel pivoted plates having their longitudinal edges beveled and abutting, and arranged to present a smooth upper surface, side and central bearings for said plates, each plate having an arm depending from the under side thereof, a rod pivotally connected to the ends of all of said arms, adjustable means on said rod for limiting its movement in one direction, automatic means for moving said rod in one direction to hold the plates normally in open position, a cable connected to the other end of said rod and means for moving said cable to swing said plates to closed position to present a smooth upper surface.

6. A member forming one of a series of elements of a dumping platform comprising two spaced rectangular plates aligned end to end, a rod beneath said plates and connecting the same together, said rod extending beyond the ends of said plates to form journals, and also forming a journal between said plates, said plates having their opposite longitudinal edges beveled and parallel and an arm having a pivot opening in the end thereof depending from one of said plates.

7. A dumping platform comprising a box-like structure having end and side members, bearing strips having a plurality of bearing openings therein secured to said side members, a central bearing strip having a plurality of bearing openings therein extending between said end members midway between said side members, a series of parallel plates pivoted in said side and central bearing strips and having their edges arranged to contact and forming a smooth upper surface, a rod beneath said plates and pivotally connected thereto, means for moving said rod in one direction to open said plates, means on said rod for varying the open position of said plates, comprising a stop member on said rod contacting the sides of a slot formed in one of said end members and through which said rod is adapted to extend, said other end member also having a slot through which said rod is adapted to pass, and means connected to said latter end of the rod for moving the same to move the plates to closed position.

8. In combination with a grain-receiving opening in the floor of an elevator, and a dumping log adjacent thereto, a dumping platform comprising a series of plates pivoted on an axis extending longitudinally thereof and having beveled and contacting edges, the upper surfaces of said plates being arranged to lie in one plane and forming a continuation of said floor when closed, and means for swinging said plates on their pivots to form discharge openings therebetween whereby grain may be discharged therethrough from a wagon on said dumping log.

9. A dumping device comprising a plurality of sections having their longitudinal edges adjacent and pivoted on longitudinal axes, the sections being adapted to be swung to open positions to form discharge openings or to be swung to have their adjacent edges substantially in contact to form a continuous platform, means acting on all of said sections simultaneously to swing the same to closed position and automatic means for swinging said sections to open positions.

In testimony whereof I affix my signature in presence of two witnesses.

LOUIS H. PALMER.

Witnesses:
WALTER HARRIS.
J. C. REINERTSON.